April 22, 1924.
C. H. HEROD
CHECK LINK MECHANISM FOR WEIGHING SCALES
Original Filed Sept. 30, 1922
1,491,041
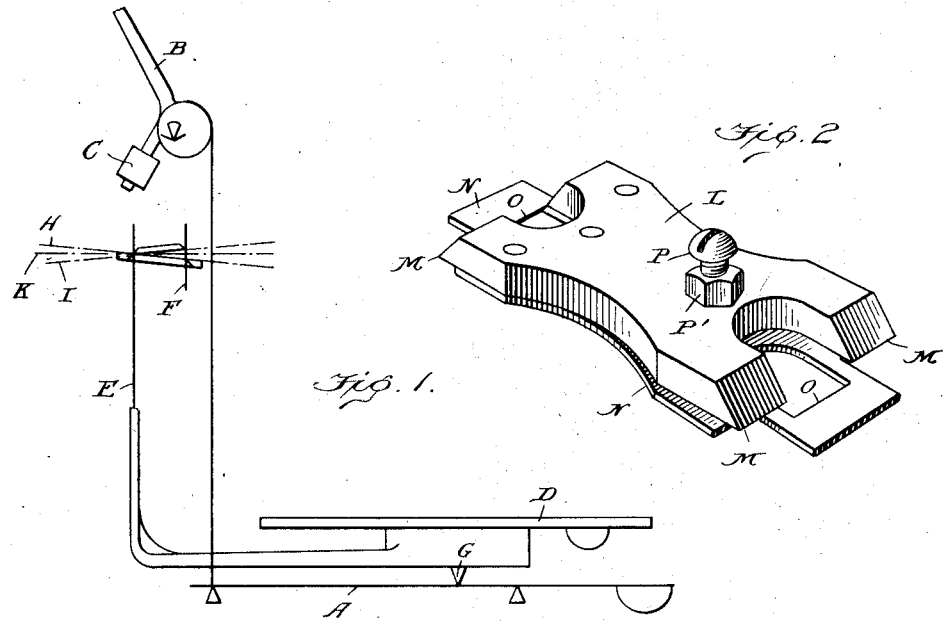
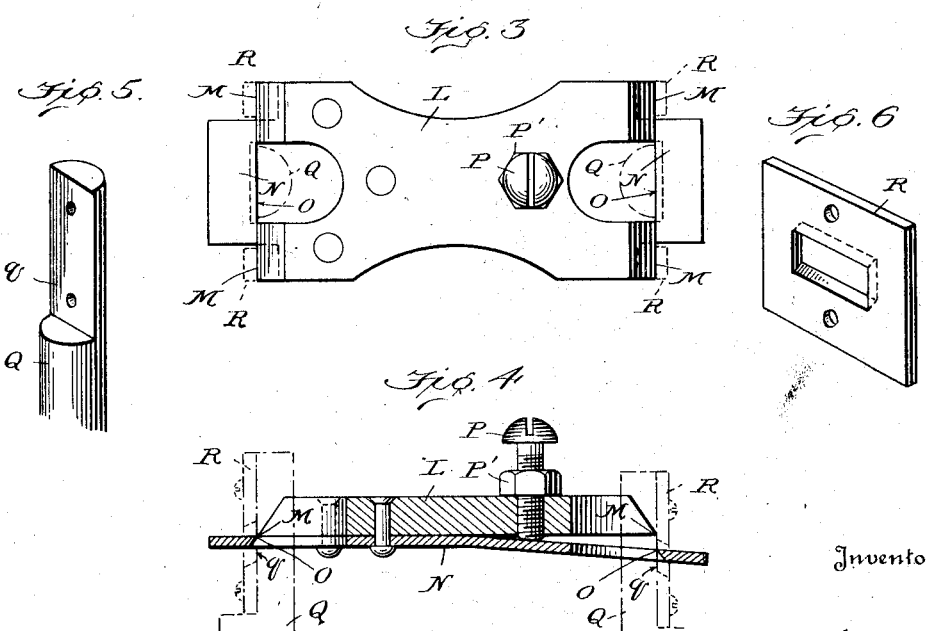
Inventor
Charles Henry Herod
By
his Attorneys Patented Apr. 22, 1924.

1,491,041

UNITED STATES PATENT OFFICE.

CHARLES HENRY HEROD, OF BRANTFORD, ONTARIO, CANADA, ASSIGNOR TO BRANTFORD COMPUTING SCALES, LIMITED, OF BRANTFORD, ONTARIO, CANADA, A CORPORATION OF CANADA.

CHECK-LINK MECHANISM FOR WEIGHING SCALES.

Application filed September 30, 1922, Serial No. 591,562. Renewed December 29, 1923.

*To all whom it may concern:*

Be it known that I, CHARLES HENRY HEROD, a subject of the King of Great Britain, residing at Brantford, in the county of Brant, Province of Ontario, Dominion of Canada, have invented certain new and useful Improvements in Check-Link Mechanism for Weighing Scales; and I do hereby declare the following to be a full, clear, and exact description of the same, reference being had to the accompanying drawings, forming part of this specification.

Check links in weighing scales are employed to prevent lateral movement of parts such as the check arm or standard during the vertical movement caused by the action of gravity of the load in opposition to the counterbalancing means. The load support or platform is usually mounted on aligned knife edge bearings carried on a pivoted scale lever and the check arm or standard and the check link serve to hold the platform horizontal and to confine the movement to a vertical movement corresponding to the small vertical arc described by the bearings on the scale lever. Obviously as the check link is pivotally connected with a fixed support at one end and with the check arm or standard at the other end a factor of inaccuracy will be introduced if the load is not distributed equally on both sides of the vertical plane of the platform supporting knife edges, inasmuch as the load will otherwise cause either a pull or a push on the check link depending upon which side of said vertical plane it happens to be located. The pull or push on the check link tends to swing the link around its center in a direction to assist or resist the downward movement of the check arm and load. Where the check link works across its dead center its influence shifts from assistance to resistance or vice versa, thus if the scale is accurate for a light load it is inaccurate for a heavy load or vice versa.

The object of this invention is to overcome this defect by providing a check link mechanism which will have the same influence on the movements of the platform regardless of the location of the load on the platform and regardless of the weight of the load within the capacity of the scale.

The invention consists in a check link mechanism embodying a check link having at one end an axis which resists both push and pull strains and at the opposite end two axes spaced apart in the direction of link movement, the pull strains being taken on one axis and the push strains on the other axis and the parts being so arranged that the push and pull strains are transmitted through the link in planes displaced angularly on opposite sides of the dead center of the link.

The invention further consists in certain small details of construction and combinations and arrangements of parts all as will be presently described and pointed out in the appended claims.

In the drawings,—

Figure 1 is a diagrammatic view illustrating in an exaggerated way the action of the check mechanism.

Fig. 2 is a perspective view of the check link.

Fig. 3 is a plan view of the link.

Fig. 4 is a sectional elevation with the posts and plates in dotted lines.

Fig. 5 is one of the posts.

Fig. 6 is one of the plates.

Referring to Figure 1 the scale lever is indicated at A, the indicator connected with the scale lever at B, the counterpoise at C, the load support or platform at D, the check arm, rigidly connected with the platform, at E and the fixed post for the check link at F. This diagrammatic representation is of a known type of scale in common use and needs no particular description.

Between the check arm E and fixed check post F there is interposed a check link which prevents the tilting of the platform on its knife edge bearings or journals G, especially when the load is placed to the front or rear of the said journals.

In accordance with the present invention the check link operates on different radii in resisting pulling and pushing strains, that is to say, strains set up by placing the load on the back or front of the platform. The angle of the radius in each instance is such that the lateral force exerted by the check arm tends to swing the link around its axis in a downward direction thus assisting rather than retarding such downward movement. This action will be readily understood from the diagram wherein the lateral pressure of the check arm to the left resulting in a pull on the link is resisted by pivotal bearings located in the plane indicated by the dotted line H and in the opposite direction resulting in a push on the link the pressure is resisted by pivotal bearings located in the plane I and in both instances the lateral pressure tends to rotate the link downwardly or in the direction the check arm is moving under the influence of the load placed on the platform. The two planes intersect at a point which is substantially in a horizontal plane including the dead center of the link movement and indicated by the dotted line K.

The preferred form of check link is illustrated in detail in Figs. 2 to 4 and comprises a body L having spaced knife edges M at each end, said edges preferably lying in a plane coincident with one of the flat faces of the body. Secured to the body near one end by suitable fastenings such as rivets is a relatively thin plate N usually of resilient metal and this plate is provided with end apertures the outer wall of which constitute knife edges O located in a plane coincident with the inner face of the plate whereby they may be in substantial alignment with the knife edges M. At one end provision is made for separating the knife edges M and O as by deflecting the plate away from the body of the link. This may be conveniently accomplished by a set screw P adapted to be secured in adjusted position by a lock nut P'.

Posts such as Q, Figs. 4 and 5, one fixed and the other on the check arm, project through the opening between the knife edges M, said posts having flat faces $q$ for cooperation with the knife edges O. For cooperation with the knife edges M and for supporting the check link at the proper level plates R, Figs. 4 and 5, are rigidly secured to the flat faces of the posts whereby the surfaces with which the knife edges at each end of the link cooperate are located in the same plane.

The relatively adjustable knife edges at one end of the link may be set the proper distance apart to cause the link to swing in the proper arc to uniformly influence the action of the scales regardless of the position of the load on the platform. Should changes in the level of either end of the link be desired this is preferably accomplished by adjusting the post vertically, the lower ends of the posts being threaded to permit of this as well as to permit of the posts being made of special metal capable of being properly tempered.

What I claim is:

1. In a scale, a platform mounted on knife edge supports, a check arm rigid with the platform, a fixed check post and a check link having knife edge bearings cooperating with the arm and post to resist lateral movement of the arm in either direction, the knife edge bearings at one end of said link being spaced from each other in the plane of movement of the link.

2. In a scale, a platform mounted on knife edge supports, a check arm rigid with the platform, a fixed check post and a check link having opposed knife edge bearings at each end for resisting lateral movement of the arm and tilting of the platform, the opposed knife edge bearings at one end of the link being adjustable with relation to each other in the plane of pivotal movement of the link.

3. A check link for scales comprising a body having knife edge bearings at opposite ends, a plate secured to said body and having knife edge bearings located in opposition to the knife edge bearings on the body, and means for adjusting one end of the plate away from the body to space the bearings apart in the plane of the pivotal movement of the link.

4. A check link for scales comprising a body having spaced outwardly directed knife edge bearings at opposite ends, a plate secured at one end to said body and having inwardly directed knife edge bearings at the ends bridging the spaces between the bearings on the body, and a set screw for adjusting the free end of the plate different distances from the body to space the knife edge bearings in a plane intersecting the axes.

CHARLES HENRY HEROD.